(12) United States Patent
Dorwin

(10) Patent No.: US 9,686,234 B1
(45) Date of Patent: Jun. 20, 2017

(54) DYNAMICALLY CHANGING STREAM QUALITY OF PROTECTED CONTENT BASED ON A DETERMINED CHANGE IN A PLATFORM TRUST

(75) Inventor: David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 356 days.

(21) Appl. No.: 13/586,492

(22) Filed: Aug. 15, 2012

Related U.S. Application Data

(60) Provisional application No. 61/569,755, filed on Dec. 12, 2011.

(51) Int. Cl.
  *G06F 15/16* (2006.01)
  *H04L 29/06* (2006.01)

(52) U.S. Cl.
  CPC .......... *H04L 63/00* (2013.01); *H04L 63/0876* (2013.01); *H04L 2463/101* (2013.01); *H04L 2463/103* (2013.01)

(58) Field of Classification Search
  CPC ......... H04L 2463/101; H04L 2463/103; H04L 63/00; H04L 63/0876
  USPC ........................................................ 709/231
  See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |

(Continued)

FOREIGN PATENT DOCUMENTS

| | | |
|---|---|---|
| EP | 0658054 A2 | 6/1995 |
| EP | 0714204 A2 | 5/1996 |

(Continued)

OTHER PUBLICATIONS

Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.

(Continued)

*Primary Examiner* — June Sison
*Assistant Examiner* — Steven Nguyen
(74) *Attorney, Agent, or Firm* — Fenwick & West LLP

(57) ABSTRACT

Embodiments are directed towards dynamically changing a quality of content being played when a robustness or level of trust is determined to have changed for a computing device, or platform, currently playing at least one stream of the content. An initial level of trust is determined for the computing device, and is used to select a quality of content from the at least one stream of content for play. During play, when a change in the level of trust is detected for the computing device, a different quality of the content may be selected, and replaces the currently playing content.

19 Claims, 6 Drawing Sheets

(56) References Cited

U.S. PATENT DOCUMENTS

| | | |
|---|---|---|
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,974,549 A | 10/1999 | Golan |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,332,194 B1 | 12/2001 | Bloom et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,460,023 B1 | 10/2002 | Bean et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,578,002 B2 | 8/2009 | Risan et al. |
| 7,640,435 B2 | 12/2009 | Morten |
| 7,805,616 B1 | 9/2010 | Mohammed et al. |
| 7,817,608 B2 | 10/2010 | Rassool et al. |
| 7,827,613 B2 | 11/2010 | Koved et al. |
| 7,953,882 B2 | 5/2011 | Shukla et al. |
| 8,457,311 B1 | 6/2013 | Schultz et al. |
| 8,560,642 B2 | 10/2013 | Pantos et al. |
| 2002/0001385 A1 | 1/2002 | Kawada et al. |
| 2002/0015498 A1 | 2/2002 | Houlberg et al. |
| 2002/0021761 A1* | 2/2002 | Zhang et al. ............ 375/240.27 |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0107803 A1 | 8/2002 | Lisanke et al. |
| 2002/0141582 A1 | 10/2002 | Kocher et al. |
| 2002/0170053 A1* | 11/2002 | Peterka .................. H04N 7/165 725/31 |
| 2003/0007568 A1 | 1/2003 | Hamery et al. |
| 2003/0037261 A1 | 2/2003 | Meffert et al. |
| 2003/0046568 A1 | 3/2003 | Riddick et al. |
| 2003/0154265 A1 | 8/2003 | Raffaele et al. |
| 2004/0031856 A1 | 2/2004 | Atsmon et al. |
| 2004/0117500 A1 | 6/2004 | Lindholm et al. |
| 2004/0151315 A1 | 8/2004 | Kim |
| 2004/0184616 A1 | 9/2004 | Morten |
| 2004/0230806 A1 | 11/2004 | Lisanke |
| 2005/0027871 A1 | 2/2005 | Bradley et al. |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2006/0020811 A1 | 1/2006 | Tan |
| 2006/0212363 A1 | 9/2006 | Peinado et al. |
| 2006/0225107 A1 | 10/2006 | Seetharaman et al. |
| 2006/0280150 A1 | 12/2006 | Jha et al. |
| 2007/0005795 A1 | 1/2007 | Gonzalez |
| 2007/0067321 A1 | 3/2007 | Bissett et al. |
| 2007/0089174 A1 | 4/2007 | Bader et al. |
| 2007/0160208 A1 | 7/2007 | MacLean et al. |
| 2007/0204300 A1 | 8/2007 | Markley |
| 2007/0209005 A1 | 9/2007 | Shaver et al. |
| 2007/0219917 A1 | 9/2007 | Liu et al. |
| 2007/0234291 A1 | 10/2007 | Ronen et al. |
| 2007/0294170 A1 | 12/2007 | Vantalon et al. |
| 2008/0027871 A1 | 1/2008 | Seo |
| 2008/0052641 A1 | 2/2008 | Brown et al. |
| 2008/0137848 A1 | 6/2008 | Kocher et al. |
| 2008/0147671 A1 | 6/2008 | Simon et al. |
| 2008/0155586 A1 | 6/2008 | Yang et al. |
| 2008/0155673 A1 | 6/2008 | Jung et al. |
| 2008/0267399 A1 | 10/2008 | Medvinsky et al. |
| 2008/0288611 A1* | 11/2008 | Toyomura et al. ............ 709/219 |
| 2008/0307454 A1 | 12/2008 | Ahanger et al. |
| 2008/0313264 A1 | 12/2008 | Pestoni |
| 2009/0006862 A1 | 1/2009 | Alkove et al. |
| 2009/0007198 A1 | 1/2009 | Lavender et al. |
| 2009/0031408 A1 | 1/2009 | Thom et al. |
| 2009/0044008 A1 | 2/2009 | Lim |
| 2009/0144836 A1* | 6/2009 | Gutta ..................... G06F 21/10 726/30 |
| 2009/0183001 A1 | 7/2009 | Lu et al. |
| 2009/0197238 A1 | 8/2009 | Moffatt et al. |

(56) References Cited

U.S. PATENT DOCUMENTS

| | | | |
|---|---|---|---|
| 2009/0208016 | A1 | 8/2009 | Choi et al. |
| 2009/0219994 | A1* | 9/2009 | Tu .................. H04N 19/186 375/240.08 |
| 2009/0249426 | A1 | 10/2009 | Aoki et al. |
| 2010/0023760 | A1 | 1/2010 | Lee et al. |
| 2010/0027974 | A1 | 2/2010 | Ansari |
| 2010/0145794 | A1 | 6/2010 | Barger et al. |
| 2010/0180289 | A1 | 7/2010 | Barsook et al. |
| 2010/0199104 | A1 | 8/2010 | Van Rijnswou |
| 2010/0211776 | A1 | 8/2010 | Gunaseelan et al. |
| 2010/0235820 | A1 | 9/2010 | Khouzam et al. |
| 2010/0242097 | A1 | 9/2010 | Hotes et al. |
| 2010/0250532 | A1 | 9/2010 | Soroushian et al. |
| 2010/0299701 | A1 | 11/2010 | Liu et al. |
| 2011/0069936 | A1 | 3/2011 | Johnson et al. |
| 2011/0145593 | A1* | 6/2011 | Auradkar ............ G06F 21/6218 713/189 |
| 2011/0179283 | A1 | 7/2011 | Thom et al. |
| 2011/0225417 | A1 | 9/2011 | Maharajh et al. |
| 2011/0305273 | A1* | 12/2011 | He et al. .................. 375/240.02 |
| 2011/0314284 | A1 | 12/2011 | Chou |
| 2012/0066494 | A1 | 3/2012 | Lee et al. |
| 2012/0079578 | A1 | 3/2012 | Dachiraju et al. |
| 2012/0114118 | A1 | 5/2012 | Verma |
| 2012/0117183 | A1 | 5/2012 | Wong et al. |
| 2012/0173884 | A1 | 7/2012 | Patil |
| 2012/0317414 | A1 | 12/2012 | Glover |
| 2012/0331293 | A1 | 12/2012 | Ma et al. |
| 2013/0072126 | A1 | 3/2013 | Topaltzas et al. |
| 2013/0097302 | A9 | 4/2013 | Khedouri et al. |
| 2013/0145406 | A1 | 6/2013 | Baskaran |
| 2013/0174222 | A1* | 7/2013 | Ogle ................................ 726/3 |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |
| JP | 03203432 A | 9/1991 |
| JP | 06335040 A | 12/1996 |
| JP | 10336128 A | 12/1998 |
| JP | 11175475 A | 7/1999 |
| JP | 2000022680 A | 1/2000 |
| JP | 2000196585 A | 7/2000 |
| JP | 2000293945 A | 10/2000 |
| JP | 2001251599 A | 9/2001 |
| WO | 96/06504 A1 | 2/1996 |
| WO | 96-32702 A1 | 10/1996 |
| WO | 99/21364 A1 | 4/1999 |
| WO | 99/28842 A1 | 6/1999 |
| WO | 99/30499 A1 | 6/1999 |
| WO | 99/54453 A1 | 10/1999 |
| WO | 01/35571 A1 | 5/2001 |
| WO | 01/93212 A2 | 12/2001 |
| WO | 02/21761 A2 | 3/2002 |
| WO | 2004/02112 A1 | 12/2003 |

OTHER PUBLICATIONS

Official Communication for U.S. Appl. No. 13/437,789 mailed Nov. 13, 2013.
Official Communication for U.S. Appl. No. 13/532,734 mailed Oct. 23, 2013.
Official Communication for U.S. Appl. No. 13/654,271 mailed Oct. 24, 2013.
Official Communication for U.S. Appl. No. 13/654,237 mailed Oct. 23, 2013.
Official Communication for U.S. Appl. No. 13/712,764 mailed. Nov. 7, 2013.
"A new approach to browser security: the Google Chrome Sandbox," Chromium Blog, http://blog.chrornium.org/2008/10/new-approach-to-browser-security-google.html, 5 pages, Oct. 2, 2008.
"Conditional access," Wikipedia, the free encyclopedia, http://en.wikipedia.org/wiki/Conditional_access, 8 pages, created Jul. 7, 2005.
"Encrypted Media Extensions, W3C Editor's Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.
"Getting Started: Background and Basics—The Chromium Projects," http://chromium.org/nativeclient/getting-started/getting-started-background-and-basics,4 pages, Sep. 2, 2008.
"Google Native Client," Wikipedia, the free encyclopedia, http://en.wikipedia.org/wiki/Google_Native_Client, 6 pages, created Dec. 9, 2008.
"HTML5," Wikipedia, the free encyclopedia, http://en.wikipedia.org/wiki/HTML5, 9 pages, created Nov. 16, 2006.
"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.
"Media Source Extensions," http://html5-mediasource-api.googlecode.com/svn/trunk/draft-spec/mediasource-draft-spec.html, 1 page, Jul. 11, 2011.
"MediaSource Extensions v0.3," editor A. Colwell, http://html5-mediasource-api.googlecode.com/svn/tags/0.3/draft-spec/mediasource-draft-spec.html, 14 pages, Mar. 13, 2012.
"Multimedia over Coax Alliance," Wikipedia, the free encyclopedia, http://en.wikipedia.org/wiki/Multimedia_over_Coax_Alliance, 4 pages, created Jun. 11, 2006.
"Sandbox—The Chromium Projects," http://dev.chromium.org/developers/design-documents/sandbox, 8 pages, Sep. 2, 2008.
"W3C HTML Working Group," http://www.w3.org/htmi/wg, 9 pages, May 9, 2007.
"Web Cryptography Working Group Charter," W3C Technology and Society domain, http://www.w3.org/2011/11/webcryptography-charter.html, 6 pages, Apr. 3, 2012.
Barth, A. et al., "The Security Architecture of the Chromium Browser," Technical Report, Stanford University, 2008.
Glazkov, D., "What the Heck is Shadow DOM?," http://glazkov.com/2011/01/14/what-the-heck-is-shadow-dom, 14 pages, Jan. 14, 2011.
Metz, C., "Google Native Client: The web of the future—or the past?" The Register, http://www.theregister.co.uk/2011/09/12/google_native_client_from_all_sides/print.html, 13 pages, Sep. 12, 2011.
Yee, B. et al., "Native Client: A Sandbox for Portable, Untrusted x86 Native Code," IEEE Symposium on Security and Privacy, Oakland 2009, 15 pages, May 16-19, 2009
Official Communication for U.S. Appl. No. 13/586,664 mailed Dec. 26, 2013.
Official Communication for U.S. Appl. No. 13/437,789 mailed Mar. 26, 2013.
Official Communication for U.S. Appl. No. 13/586,664, mailed Jun. 20, 2013.
"Digital rights management,"Wikipedia, the free encyclopedia, last modified Mar. 30, 2012, 30 pages http://en.wikipedia.org/w/index.php?title=Digital_rights_management&printable=yes.
"Establishing Interconnectivity among Various Makers'Products through Standardization of VOD Protocol", NTT Corporation Press Release, Sep. 27, 2002 http://www.ntt.co.jp/news/news02e/0209/020927.html.
"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes.
"Intelligent Systems for Finance and Business," Goonatilake, S. et al., eds., Chapters 2-10, 1995, pp. 31-173.
"Irdeto Access and Optibase create Strategic Alliance", Press Release, Irdeto Access, Dec. 14, 2000 pp. 1-4 http://www.irdetoaccess.com/press/0000041.him.
"Irdeto Access and Optibase create Strategic Alliance", Press Release, Optibase, Dec. 14, 2000, pp. 1-2 http://www.optibase.com/html/news/December_14_2000.html.

(56) References Cited

OTHER PUBLICATIONS

"PlayReady,"Wikipedia, the free encyclopedia, last modified Jan. 30, 2012, 2 pages http://en.wikipedia.org/w/index.php?title=PlayReady&printable=yes.
"Scalable Video Coding," Wikipedia, the free encyclopedia, last modified Sep. 10, 2012, 4 pages http://en.wikipedia.org/w/index.php?title=Scalable_Video_Coding&printable=yes.
"UltraViolet (system)," Wikipedia, the free encyclopedia, last modified Feb. 20, 2012, 5 pages http://en.wikipedia.org/w/index.php?title:UltraViolet_(system)&printable=yes.
"What is HDCP (high definition copy protocol)?" Digital Connection, 2005, 2 pages http://www.digitalconnection.com/FAQ/HDTV_12.asp.
Balthrop, J. et al., "Coverage and Generalization in an Artificial Immune System", Proceedings of Genetic and Evolutionary Computation Conference (GECCO), 2002, pp. 1-8.
Blumenfeld, S. M., "Streaming Media—System Security," Broadcast Engineering Magazine, Oct. 2001, pp. 1-2.
Canadian Examiner Report for Application No. 2,559,323 mailed May 6, 2008, 3 pages.
Cheng, H. C. H., "Partial Encryption for Image and Video Communication", Department of Computing Science, University of Alberta, Fall 1998, pp. 1-87.
Cheng, H. et al., "Partial Encryption of Compressed Images and Videos", IEEE Transactions on Signal Processing, vol. 48, No. 8, Aug. 2000, pp. 2439-2451.
Deitcher, D., "Secure Implementations of Content Protection (DRM) Schemes on Consumer Electronic Devices," Discretix, White Paper, May 2011, 17 pages.
Eskicioglu, A. M. et al., "An Overview of Multimedia Content Protection in Consumer Electronics Devices", SP:IC, vol. 16 No. 7, Apr. 2001, pp. 681-699.
Ferrill, E. et al., "A Survey of Digital Watermarking", Feb. 25, 1999, 15 pages http://elizabeth.ferrill.com/papers/watermarking.pdf.
Forrest, S. "Research Projects," Dec. 2, 2003, pp. 1-3 http://www.cs.unm.edu/.about.forrest/projects.html.
Goodman, J. et al., "Low Power Scalable Encryption for Wireless Systems", Wireless Networks, No. 4, 1998, pp. 55-70.
Griwodz, C. et al., "Protecting VoD the Easier Way", ACM Multimedia, Bristol, UK, Jan. 1998, pp. 21-28.
Griwodz, C. "Video Protection by Partial Content Corruption", Multimedia and Security Workshop at ACM Multimedia, Bristol, UK, Sep. 1998, pp. 1-5.
Hunter, J., et al., "A Review of Video Streaming Over the Internet", DSTC Technical Report TR97-10, Aug. 1997, pp. 1-28.
International Search Report and Written Opinion for International Patent Application No. PCT/US07/62055 mailed Sep. 11, 2007.
Kirovski, D. et al, "Digital Rights Management for Digital Cinema", Proceedings of the SPIE, Bellingham, VA, vol. 4472, Jul. 31, 2001, p. 105-120.
Office Action for European Patent Application No. 05250968.4 mailed Jan. 26, 2006.
Official Communication for Chinese Patent Application No. 2004800071571 mailed Apr. 13, 2007.
Official Communication for European Patent Application No. 04757582.4 mailed May 22, 2007.
Omneon Video Networks Product Announcement, "Broadband Streaming—Omneon and BSkyB", tb-1006-1, created 2002, pp. 1-4.
Schulzrinne, H., et al., "Real Time Streaming Protocol (RTSP)," RFC 2326, Apr. 1998, pp. 1-86.
Schulzrinne, H., et al., "RTP: A Transport Protocol for Real-Time Applications", RFC 1889, Jan. 1996, pp. 1-75.
Search Report for European Patent Application No. 05250968,4 mailed Oct. 12, 2005.
Spanos, G. et al., "Performance Study of a Selective Encryption Scheme for the Security of Networked, Real-Time Video". Proceedings of the Fourth International Conference on Computer Communications and Networks, ICCCN '95, Las Vegas, NV, Sep. 1995, pp. 2-10.
Supplementary European Search Report for European Patent Application No. 00986215 dated Nov. 14, 2005.
Supplementary European Search Report for European Patent Application No. 04757582.4 mailed Nov. 20, 2006.
Teixeira, L. M. et al, "Secure Transmission of MPEG Video Sources", Proceedings of IEEE Workshop on ISPACS Nov. 6, 1998, pp. 1-5.
Wu, T.-L. et al., "Selective Encryption and Watermarking of MPEG Video (Extended Abstract)", submitted to International Conference on Image Science, Systems, and Technology, Feb. 17, 1997, 10 pages.
Yoshida, K. et al., "A Continuous-Media Communication Method for Minimizing Playback interruptions", IS&T/SPIE Conference on Visual Communications and Image Processing, San Jose, California, vol. 3853, Jan. 1999, 10 pages.
Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277
Official Communication for U.S. Appl. No. 13/437,789 mailed Aug. 14, 2013.
Patent Board Decision for U.S. Appl. No. 13/538,948, Nov. 30, 2016, 8 Pages (Copy is not enclosed as U.S. Appl. No. 13/538,948 is not yet published).

\* cited by examiner

DYNAMICALLY CHANGING STREAM QUALITY OF PROTECTED CONTENT BASED ON A DETERMINED CHANGE IN A PLATFORM TRUST

CROSS-REFERENCE TO RELATED APPLICATION

This application is a utility patent application based on previously filed U.S. Provisional Patent Application, Ser. No. 61/569,755 filed on Dec. 12, 2011, the benefit of which is hereby claimed under 35 U.S.C. §119(e) and incorporated herein by reference.

TECHNICAL FIELD

The present embodiments relate generally to managing play of digital content and, more particularly, but not exclusively, to dynamically changing a quality of content being played, either by increasing or decreasing the quality, when a robustness or level of trust is determined to have changed for a computing device, or platform, during the play of at least one stream of the content.

BACKGROUND

Movies, music, and other forms of digital content are provided to our computers over the Internet virtually everyday. We receive news, education, and entertainment, as well as many other forms of digital content. For a variety of reasons, some of this content is protected. Such protections may take the form of requiring a license that at least identifies various rights to use, play, copy, and/or distribute the associated content. Other protections may include various levels of types of encryption protection that may necessitate a key in order to decrypt the content. It is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
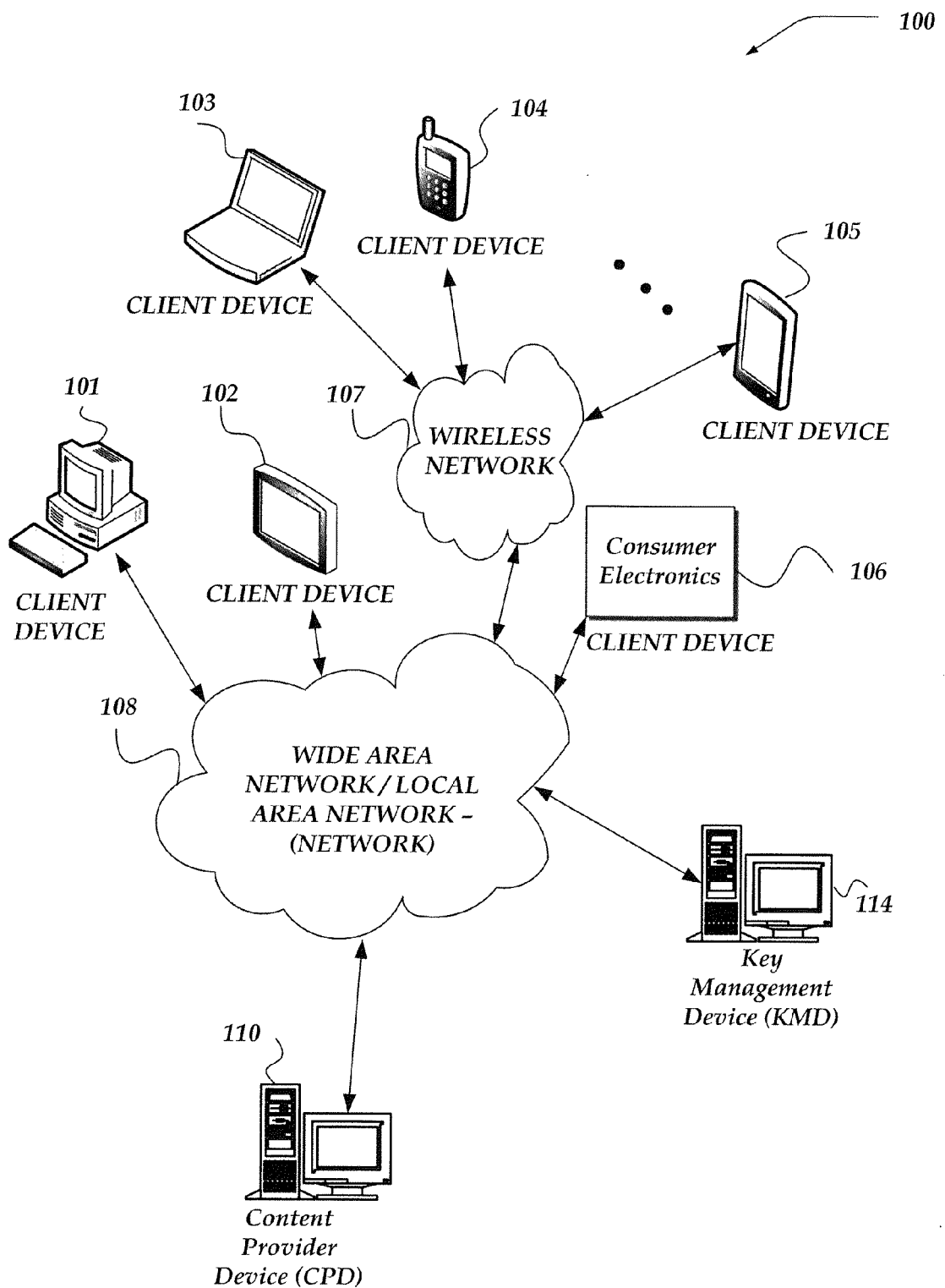
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms.

As used herein, the term "streaming digital content" refers to digital content received by and prepared for presentation for play at a client device while, in real time or substantially real time, being delivered by a provider, typically over a network such as the Internet. As used herein, the term "substantial" refers to as close to real-time as possible given networking, hardware and/or software constraints. With streaming, the client device can start playing the digital content before the entire content stream has been transmitted/received at the client device.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys usable for decrypted the differently encrypted digital content may be rotated, reused, or renegotiated.

As used herein, the term "quality" of content (or quality of play—of content) refers to at least one of a spatial resolution, temporal resolution, a video feature, an audio feature, a bit rate, or a dimensional feature that affects how the content is played, including any one or more of how it is displayed, sounds, or otherwise is visually and/or audibly perceived. For example, a spatial feature may include a picture size or scalability feature of the content. That is video components of the content may be coded based on a selected spatial resolution to provide less or more resolution. Similarly, a temporal or frame rate quality affects such features as motion compensation dependencies with the content. Changing from a higher level or lower level of quality therefore refers to selecting content having a different (either higher or lower) level of quality than a currently selected level of quality. For example, a higher level of quality might refer to content having a higher level of resolution, compared to other content having a lower level of resolution. Resolution, is merely an example, and is not intended to constrain the usage of the terms, quality, higher/lower level of quality. As used herein, the term "robustness" of a device refers to a determination of a level of quality, as well as a level of trust and security of the platform. In at least some instances, providing access to the content, licenses, and/or keys may be based on a level of trust or robustness of a client device requesting access to the content.

In at least one embodiment, data collected and/or generated in the determination of a level of trust may be protected for access and/or distribution outside of the client device. In this manner, a user's privacy may be protected.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards dynamically changing a quality of content being played when a robustness or level of trust is determined to have changed for a computing device, platform, or software environment, currently playing at least one stream of the content. An initial level of trust is determined for the computing device, and is used to select a quality of content from the at least one stream of content for play. During play, when a change in the level of trust is detected for the computing device, a different quality of the content is selected, and replaces the currently playing content. In one embodiment, the at least one stream of content may comprise a plurality of substreams, sometimes called layers, where each substream within the at least one stream may comprise a different level of quality. For example, in one embodiment, one substream in the plurality of substreams may be unencrypted, and have a lowest level of resolution, bit rate, or other quality feature. Other substreams in the plurality may be encrypted, and have varying levels of increasing quality. For example, in one embodiment, the lowest level of quality in plurality of substreams might not include B-frames in a video stream of content.

In one embodiment, the plurality of substreams may be configured using a scalable video coding feature, such as Annex G extension of the H.264/MPEG-4 AVC video compression standard. Using the approach a scalable CODEC may be employed to receive the plurality of substreams, and based on a determined level of trust, select one or more substreams in the plurality of substreams. The scalable CODEC may then combine the one or more substreams to produce a stream of content at a determined level of quality associated with the determined level of trust. In one embodiment, the lowest level of quality substream might be unencrypted. However, in another embodiment, each of the substreams in the plurality of substreams is encrypted.

In one embodiment, the switching between substreams of content within the at least one stream of content may be performed without a visible or readily detected audio delay during swapping between substreams. This may be achieved for example, where negotiations for keys, licenses and the like, is performed previously, or while continuing to play a previous stream of content before swapping between streams. However, in another embodiment, dynamically changing between streams of content with different levels of quality based on changes in trust, may incur some delay, until a key/license is renegotiated or the new stream can be downloaded.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet-based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide at least one stream of digital content to a client device. In one embodiment, at least some portions of the at least one stream may be encrypted, while at least some other portions of the at least one stream may be unencrypted. As discussed further below, in one embodiment, the at least one stream includes at least two streams of digital content—a first stream that is unencrypted, and a second stream that is encrypted, both streams having the same digital content. In one embodiment, the unencrypted stream may be encoded at a lower quality level, a lower resolution, or even a lower bit rate than the encrypted stream. In another embodiment, CPD 110 may provide a plurality of substreams using a scalable video coding approach. In one embodiment, CPD 110 may employ an Annex G extension of the H.264/MPEG-4 AVC video compression standard, or the like. In one embodiment, different substreams within the plurality of substreams may be encoded with differing levels of complexity and then later be combined to provide different levels of quality of playable content, such as is described in more detail below in conjunction with FIG. 6. Similarly, encryption may be performed using varying levels of complexity.

It should be readily recognized that CPD 110 is configured to operate on behalf of a content owner, distributor, or similar business entity. However, while used herein to represent such network devices usable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys usable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, ElGamal, or the like. Similarly, various possible symmetric key technologies include, but are not limited to, Twofish, Serpent, AES (Rijndael), Blowfish, CASTS, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices. Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
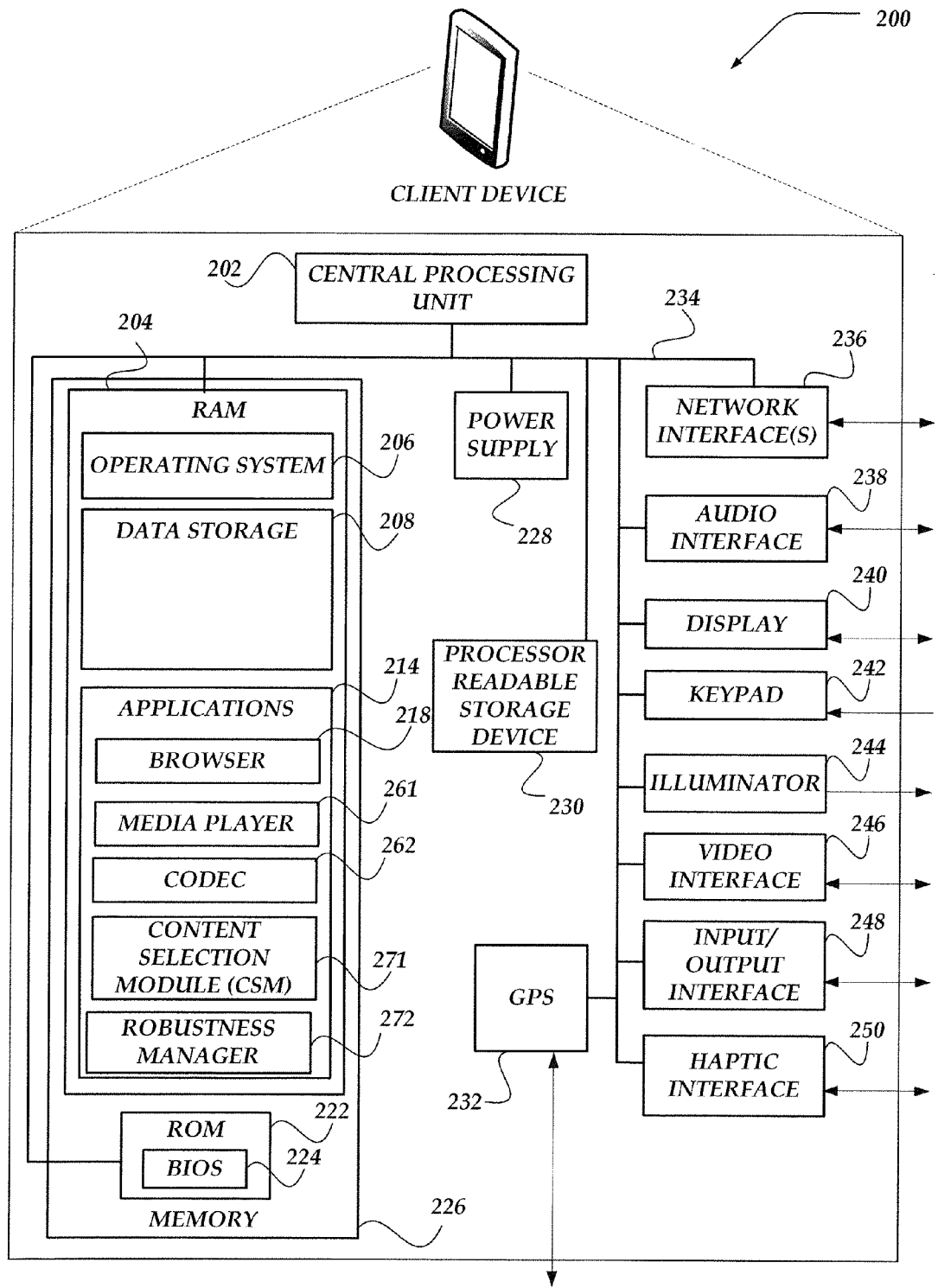
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms usable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), WiDi. At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in a level of trust of at least one component of client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, Content Selection Module 271, Coder/Decoder (CODEC) 262 (also sometimes referred to as Compressor/Decompressor), and robustness manager 272.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content. Thus, other user agents may also be included within client device 200.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content.

CSM 271 represents any of a variety of software and/or hardware configurations arranged to receive at least one stream of digital content, where the received at least one stream of content has a plurality of different levels of defined quality of content. CSM 271 may receive information about a detected level of trust for client device 200 from, for example, robustness manager 272. Then, using the level of trust, CSM 271 selects a level of defined quality of the content for play. In one embodiment, CSM 271 may further negotiate one or more licenses, and/or decryption keys usable to decrypt and enable play of the at least one stream of content at the determined level of quality. In one embodiment, some of the received at least one stream of content may be unencrypted. For example, as discussed further below, a substream of the content having a lower level of quality than another substream, may be unencrypted, such that at least some of the content might be decoded/decompressed and readied to play more quickly than other content that might need licenses/keys obtained and to be decrypted prior to being decoded/decompressed and readied for play. In still another embodiment, CSM 271 may, for any of a variety of reasons, select not to change the quality of the content in response to additional information received by another source, such as a server, or the like.

Moreover, in one embodiment, it should be understood that while CSM 271 is described as enforcing licenses, another component, entity, application, hardware component, of the like, may perform such actions instead. Thus, the configuration of FIG. 2 is not to be construed as limiting embodiments of the innovation. Further, the license-enforcing entity (e.g., CSM 271) might in one embodiment, elect not to just stop all playback/decryption based on the determined level of trust, as well as for other reasons. That is, in one embodiment, such activity may instead enable a different key to be used, providing a small grace period while switching of substreams, or streams is performed.

In any event, CSM 271 may provide some of the content to media player 261 for play. In one embodiment, media player 261 might receive some of the content in a coded or compressed form. Media player 261 may then employ CODEC 262 to decode and/or decompress the received portion of content stream such that the content is readied for play virtually as soon as it is received. CSM 271 may employ a process such as disclosed below in conjunction with FIG. 5 to perform at least some of its actions.

Robustness manager 272 represents any of a variety of mechanisms configured to monitor a level of trust of various components of client device 200, and notify at least CSM 271 of any detected changes to the level of trust of the examined components. Robustness manager 272 may, for example, perform various security checks to determine whether a hacker product, a virus, a Trojan horse, or any of a variety of suspect products is detected on client device 200. Robustness manager 272 may also perform various security checks to determine whether various components have been modified improperly. For example, robustness manager 272 may perform security analysis on media player 261, operating system 206, browser 218, and CSM 271 to determine whether any of these components have been improperly modified. Robustness manager 273 may also monitor for changes in any of the hardware configuration, changes in drivers used to interact with various hardware components, and/or changes to various network connections for the platform, client device 200. In one embodiment, robustness manager 272 may perform the monitoring by passively watching data, signatures, memory, traps, or other information to determine a change in the level of trust. In another embodiment, robustness manager 272 may perform active probing of various components to detect a response indicating a change in the level of trust. In one embodiment, robustness manager 272 may further monitor for possible developers switches, devices being rooted or modified, disabled, or otherwise being interfered with improperly, as well as modifications, disablements, and/or other types of interferences with a trusted/secure boot action of client device 200.

When robustness manager 272 determines that a level of trust of any of the various components has changed, it may send a message to at least CSM 271. In one embodiment, CSM 271 may then, as discussed above, select a different level of defined quality of content based on the detected level of trust. As noted, such monitoring and changes in quality of content being played may be performed dynamically, while the content is playing. Thus, while the content is playing through media player 261, monitoring to detect a change in the level of trust of client device 200 is performed. When a change is detected, CSM 271 may dynamically select one or more substreams having a different level of quality than that which is currently playing. CSM 271 and/or robustness manager 272 may renegotiate licenses/keys associated with the different level of quality. When the different level of quality is decrypted (if needed), decoded/decompressed, and readied for play, CSM 271 may seamlessly switch the stream content to the different level of quality, such that a minimal or no interruption is perceived between playing of a previous portion of the content stream and the different level of quality of the content stream.

In at least one embodiment, any data collected and/or generated by robustness manager 272 may be protected from improper access, so as to protect a user's privacy and/or anonymity.

CODEC 262 includes any of a variety of compression/decompression mechanisms configured to receive compressed content and decompress the content into a format capable of being rendered for the user's enjoyment. For example, CODEC 262 may employ Moving Pictures Experts Group (MPEG), Joint Photographic Experts Group (JPEG), wavelets, and/or any other mechanism that compresses content that may later be decompressed. Further, although CODEC 262 may include capabilities for graphical content, CODEC 262 may also be configured to receive audio content, and as appropriate, prepare the audio content for play by a media player as well. Thus, CODEC 262 may not be exclusive for graphical content, and may also operate on audio, graphical content, and/or content having a combination of audio and graphical information.

In one embodiment, CODEC 262 may also be configured to receive scalable video coding content that is encoded in a plurality of substreams. In one embodiment, the subset video bitstreams (substreams) may be derived by dropping packets from a larger video to reduce a bandwidth for one of the subset bitstreams. The subset bitstreams, described further below in conjunction with FIG. 6 may represent a lower spatial resolution (smaller screen), lower temporal resolution (lower frame rate), lower quality/less data (e.g., at a same resolution), or the like. CODEC 262 may receive various substreams, including a baseline profile substream, and one or more higher quality profile substreams. CODEC 262 may then combine the substreams to produce for play a single stream of content that has a level of quality at the highest substream employed in the combination.

Figure 4:
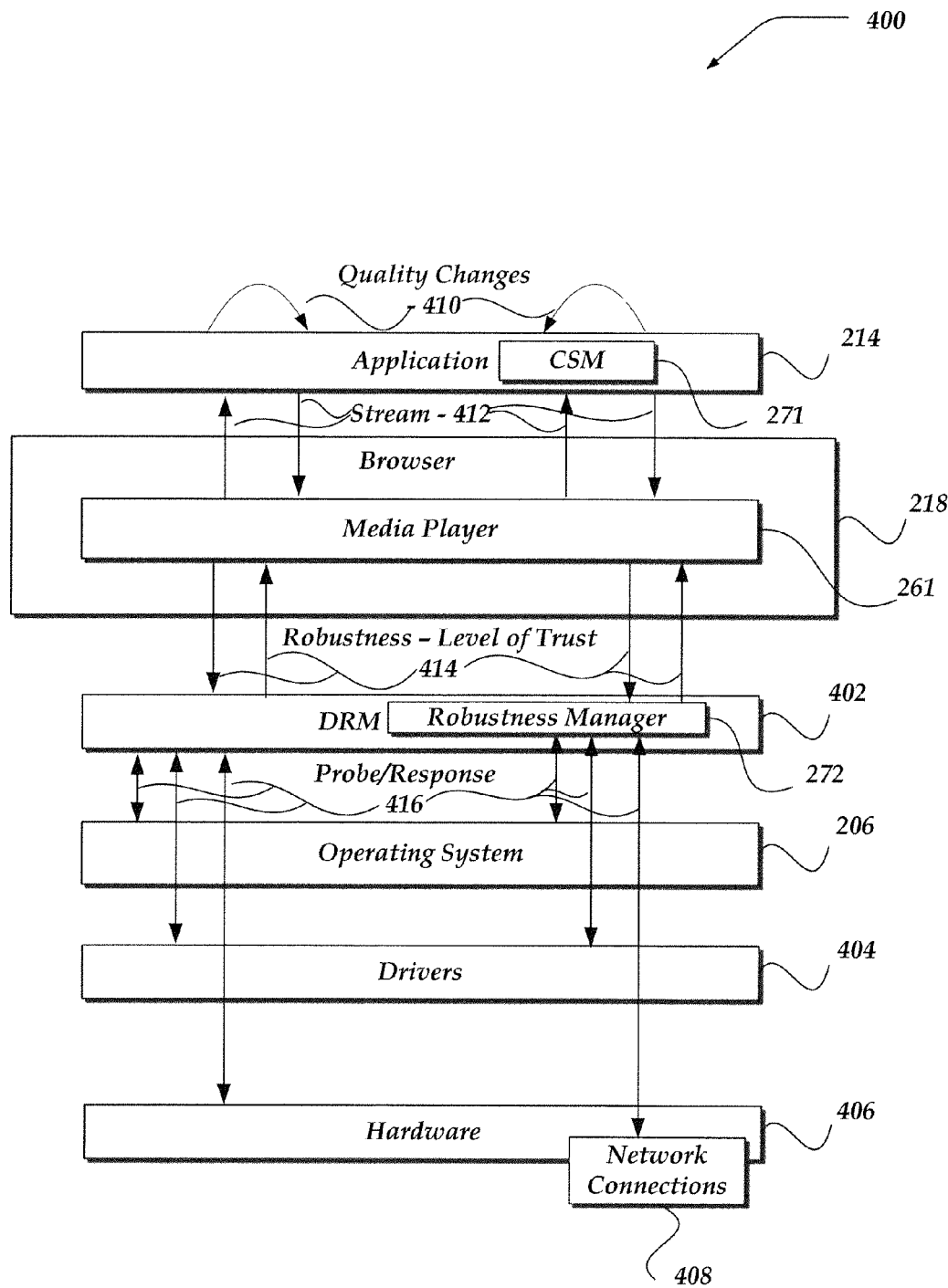
FIG. 4 illustrates one possible embodiment of signal flow between various components with a client device or other platform playing digital content.

FIG. 4 illustrates one possible embodiment of signal flow between various components with a client device or other platform playing digital content. Architecture 400 of FIG. 4 provides a different perspective of various components of FIG. 2.

Thus, as illustrated, architecture 400 includes applications 214, which includes, for example, CSM 271; browser 218 which illustrates one embodiment of media player 261 within browser 218; digital rights manager (DRM) 402, which includes robustness manager 272; operating system 206; drivers 404; hardware 406 with various network connections 408.

Architecture 400 may include many more or less components, connections and/or communication paths than those shown in FIG. 4. However, the components, connections, and/or paths shown are sufficient to disclose an illustrative embodiment for practicing the present invention. Moreover, it should be understood that the arrangements of the various components is not constrained to that which is shown, and other arrangements may also be employed. For example, in one embodiment, the DRM (e.g., license manager) and CSM may be separate components, or integrated into a single component.

Briefly, drivers 404, sometimes called device drivers or software drivers, represents programs that are arranged to allow other programs to interact with hardware 406. Although not illustrated, drivers 404 may communicate with hardware 406 through a computer bus, such as bus 234 of FIG. 2.

Hardware 404 represents virtually any hardware component of client device 200, where network connections 408 represents any hardware/software interface component usable to connect to a device typically considered external to client device 200, including display systems, storage devices, networks, or the like. In one embodiment, network connections 408 may include various display connection types, including cables, and/or related protocols, as discussed above.

As shown in architecture 400 at least one stream of content 412 may be received and provided to media player 261, through, for example, browser 218. DRM 402 may negotiate licenses/keys usable to play the received at least one stream of content 412. Further, robustness manager 272 may monitor and/or probe various components, including, operating system 206, drivers 404, hardware 406, and network connections 408, to detect a level of trust for the platform. Robustness manager 272 may receive a response to the probes (416). As illustrated, 414 illustrates flows for capturing robustness or levels of trust, 416 represents flows for probes and responses, while 410 illustrates quality changes, and 412 illustrates at least one stream of content.

In some embodiments, robustness manager 272 may be configured to be a highly trusted and/or secured component. For example, robustness manager 272 may be implemented such that data associated with robustness manager 272 is protected to be read only, and/or readable based on restrictions. Such restrictions may include but not be limited to restricting the data to not being transmitted outside of client device 200. Further, the collected data, and/or any data generated as a result of analysis of the collected data might be further protected from access. In at least some embodiments, such protection may be implemented to protect privacy of a user, the client device contents, configuration, or the like.

In one embodiment, a single change in a configuration of one of the components may be sufficient to detect a level of trust. However, robustness manager 272 may also employ various tables, weighting algorithms, or a variety of other criteria to determine whether a change in the level of trust is detected. Robustness manager 272 may then provide the change information to CSM 271, DRM 402, or another application 214. CSM 271 may then select a defined level of quality for the content that is associated with the change in the level of trust. The change in the defined level of quality may then affect which substreams or combination of substreams within the at least one stream of content to employ and provide to media player 261 for play.

It should be noted that DRM 402, robustness manager 272, CSM 271, or the like, may be downloaded and installed onto a platform, such as client device 200, or the like, from another computer, a memory storage device, or the like. For example, in one embodiment, such components, may reside on an apparatus that includes a non-transitory computer readable medium, having computer-executable instructions stored thereon. In response to execution by a computing device, computer-executable instructions may cause a computing device to perform operations, such as described below in conjunction with FIG. 5.

Illustrative Network Device

Figure 3:
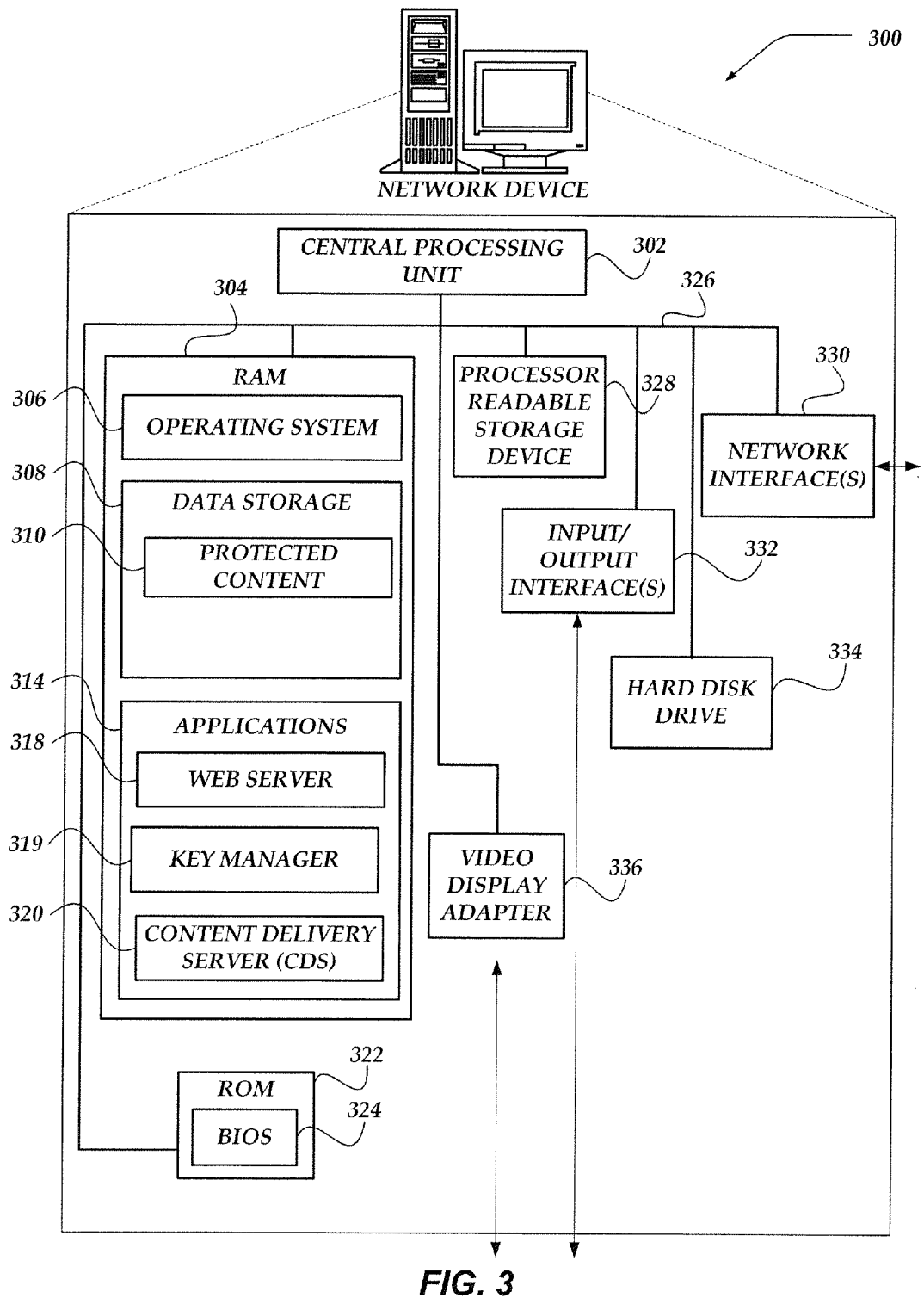
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store streams of protected content 310. Streams of protected content 310 represent any of a variety of content that may be protected from access using a license, encryption, and/or the like. In some embodiments, streams of protected content 310 may include a plurality of available versions of content. In one embodiment, the available versions may include one or more video tracks and/or one or more one or more audio tracks. In some embodiments, each video track may be in a different video quality, or the like. In other embodiments, each audio track may be in a different audio quality or the like. Various non-limiting, non-exhaustive examples of streams of protected content 310 are described in more detail below in conjunction with FIG. 6.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to streams of protected content 310. In one embodiment, the content may be protected through a license or licenses. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

Moreover, in at least one embodiment, network device 300 may be configured to provide to a client device, such as shown in FIGS. 1-2, a content selection module (CSM) 271 and/or robustness manager 272. For example, during an initial registration with a content provider device, such as CPD 110 of FIG. 1, or the like, network device 300 may provide for download, or any other form of access, CSM 271, robustness manager 272, and/or other components. The receiving client device may then install for execution such components for use with various embodiments described herein.

General Operation

Figure 5:
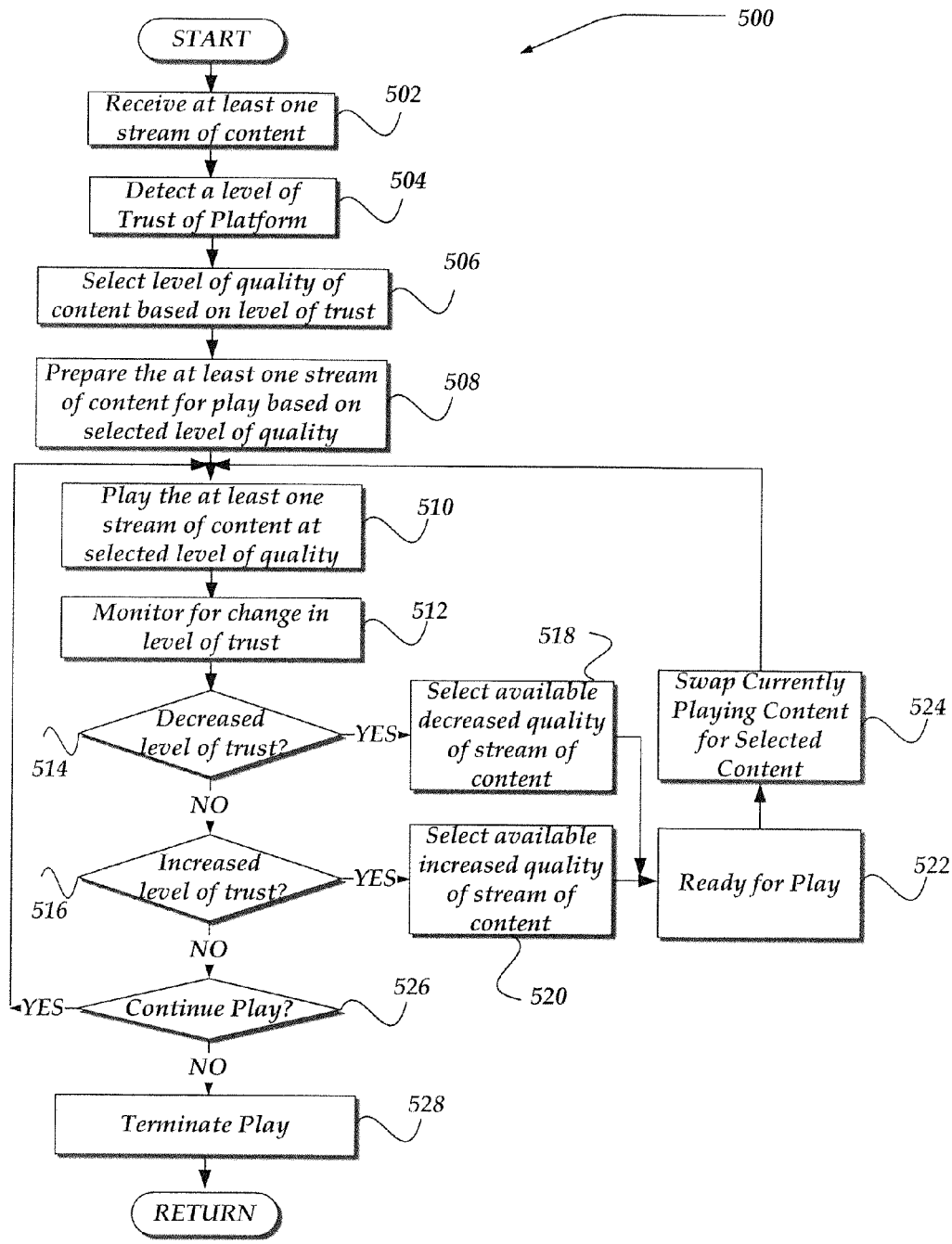
FIG. 5 illustrates a flow chart of one embodiment of a process usable to dynamically change a quality of a stream of content playing within a client device, or other platform, when a change in a level of trust of the client device is detected.

The operation of certain aspects of various embodiments will now be described with respect to FIG. 5. FIG. 5 illustrates a flow chart of one embodiment of a process 500 usable to dynamically change a quality of a stream of content playing within a client device, or other platform, when a change in a level of trust of the client device is detected.

Process 500 of FIG. 5 may be performed within a client device, such as client devices 101-106 of FIG. 1, or client device 200 of FIG. 2. In one embodiment, process 500 is provided as computer-executable instructions for execution within a client device, using, for example, CSM 271 and/or robustness manager 272 of FIG. 2.

In any event, a client device may send a request for digital content to be streamed to the client device. In one embodiment, the digital content may streamed over a network to the client device. As such, process 500 may begin, after a start block, wherein at least one stream of content is received at the client device (platform). Continuing next, process 500 flows to block 504, where a level of trust is detected for the platform (client device). In one embodiment, the detection of the level of trust may be determined based on responses to a variety of probes sent to various components within and/or connected to the client device. However, passive monitoring of various actions, and/or data, signatures, or the like, may also be performed to detect a level of trust for the client device.

Processing flows next to block 506, where a level of quality of the at least one stream of content is selected based on the detected level of trust. For example, it might be determined initially that the client device is detected at a lowest level of trust, based on using a non-HDCP compliant network connection type. Thus, the level of quality for the content might be selected as a lowest level of quality. For example, the selected content corresponding to the lowest level of quality might have a lowest acceptable resolution, bit rate, or the like, for the content, where acceptable might refer to an ability, for example, to view or hear some of the content, but, the content is grainy, runs slow, or has low audio quality, or the like. It should be noted that while illustrated as flowing in sequence, other embodiments need not be so constrained. For example, in another embodiment, block 506 may occur in parallel or concurrently with block 504. Moreover, block 506 may automatically choose an acceptable level of content while trust is verified, which may then feed into block 512. In that way, the time to a first frame may be further reduced.

Processing flows next to block 508, where based on the selected level of quality for the content, the content is prepared for play. In one embodiment, a license/keys might be negotiated to enable access and/or decryption of at least some of the at least one stream of the content for the selected level of quality. Further, any combining of substreams, decoding/decompressing or the like, may be performed on the received at least one stream at the level of quality.

Flowing next to block 510, the readied portion of the at least one stream of content is played at the client device at the selected level of quality. Process 500 flows next to block 512.

At block 512, similar to block 504, monitoring, including active and/or passive actions are performed to detect a change in the level of trust for the client device. It should be noted that while block 512 is illustrated within a sequence of blocks, block 512 could be executed continuously and/or external to process 500. In any event, block 512 is performed at least while content is being played. This is done to detect changes of trust of the platform dynamically, and make changes in the played content's quality as appropriate.

In any event, processing flows to decision block 514, where a determination is made whether the level of trust is decreased over a current level of trust—the level of trust for the currently playing content. When the level of trust is decreased, processing flows to block 518; otherwise, processing flows to decision block 516.

At decision block 516, a determination is made whether the level of trust is increased over a current level of trust—the level of trust for the currently playing content. When the level of trust is increased, processing flows to block 520; otherwise, processing flows to decision block 526.

At block 518, a decreased quality of the at least one stream of content that is available is selected. That is, if the currently playing level of quality is at a lowest possible quality for the content stream, then, no other lower level is available, and in one embodiment, the currently playing level—is the same as the decreased quality level. Thus, no change in quality might occur. However, in one embodiment, the decrease in trust may indicate that no content is to be played. In which instance, the content may not be swapped, but playing of the content may be terminated (flowing to block 528, instead). However, should there be a lower level of content available, then that lower level is selected and prepared for playback at block 522. Again, prepared for play may include changing keys, licenses, decrypting, decoding, or the like, as appropriate. In one embodiment, during preparation of the decreased level of quality content stream, the currently playing content may be allowed to continue to play. Moving to block 524, when the newly prepared content stream is ready for play, the content may be synchronized to start play at a position consistent with where the current content is being played. In this manner, the transition from the currently playing at least one content stream to the prepared and readied at least one content stream at a lower quality may appear to be seamless (other than a possible detectable quality difference). Processing then loops back to block 510 to continue until the content stream is terminated.

At block 520, an increased quality of the at least one stream of content that is available is selected, based on the detected increased level of trust. Again, if the currently playing level of quality is at its highest available within the at least one stream of content, then no other higher level is available. In this situation, the highest level of quality may be allowed to continue to play, without interruption. However, if a higher level of quality is available within the at least one stream of content, then at block 520, any keys/licenses may be negotiated, the content at the higher level of quality is decrypted, decoded/decompressed, and/or otherwise readied for play, at block 522. Processing then flows to block 524, as discussed above, the newly readied content at a higher level of quality replaces the currently playing content, in a seamless manner. Processing then loops back to block 510.

At decision block 526, a determination is made whether to continue to play the currently playing at least one content stream. If not, processing flows to block 528 where playing of the content is terminated. Processing then returns to a calling process. Otherwise, if the content is to continue to play, processing loops back to block 510.

Thus, as can be seen, the above is directed to dynamically changing the stream quality to match a current level of platform security, verification, or trust. This is performed to maintain a best level of user experience consistent with the level of trust for the platform playing the content.

When the robustness or trust decreases, the content stream can be switched to a lower quality of stream that is appropriate. For example, switching to SD if a non-HDCP display is connected, where previously an HDCP display was connected. Depending on security considerations, and risk tolerances, playing may continue uninterrupted for a short time period that it may take to prepare the new content for playing. Otherwise, in one embodiment, there could be a short pause, with or without notice, while the new stream is obtained and readied for play.

Where the CODEC supports scalable layers of content (differing quality of substreams), then the switch may be made immediately, because the lower quality stream and its keys may already be available.

When the robustness or trust increases, the content can be switched to a higher quality stream, such as HD when all the non-HDCP displays, for example, have been disconnected. Because security is increased, the higher quality stream can be displayed as soon as the new stream and possibly new license/keys are obtained, as discussed above.

Thus, rather than stopping play of content as a configuration of the platform dynamically changes, such as when a user replaces or otherwise removes protected display devices, or other trust features are changed, including, for example, dynamically changing a configuration to a developer mode, an admin console is modified, or the like, changes to the quality of the playing content can dynamically occur.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

Non-Limiting, Non-Exhaustive Examples of Digital Content Streams

Figure 6:
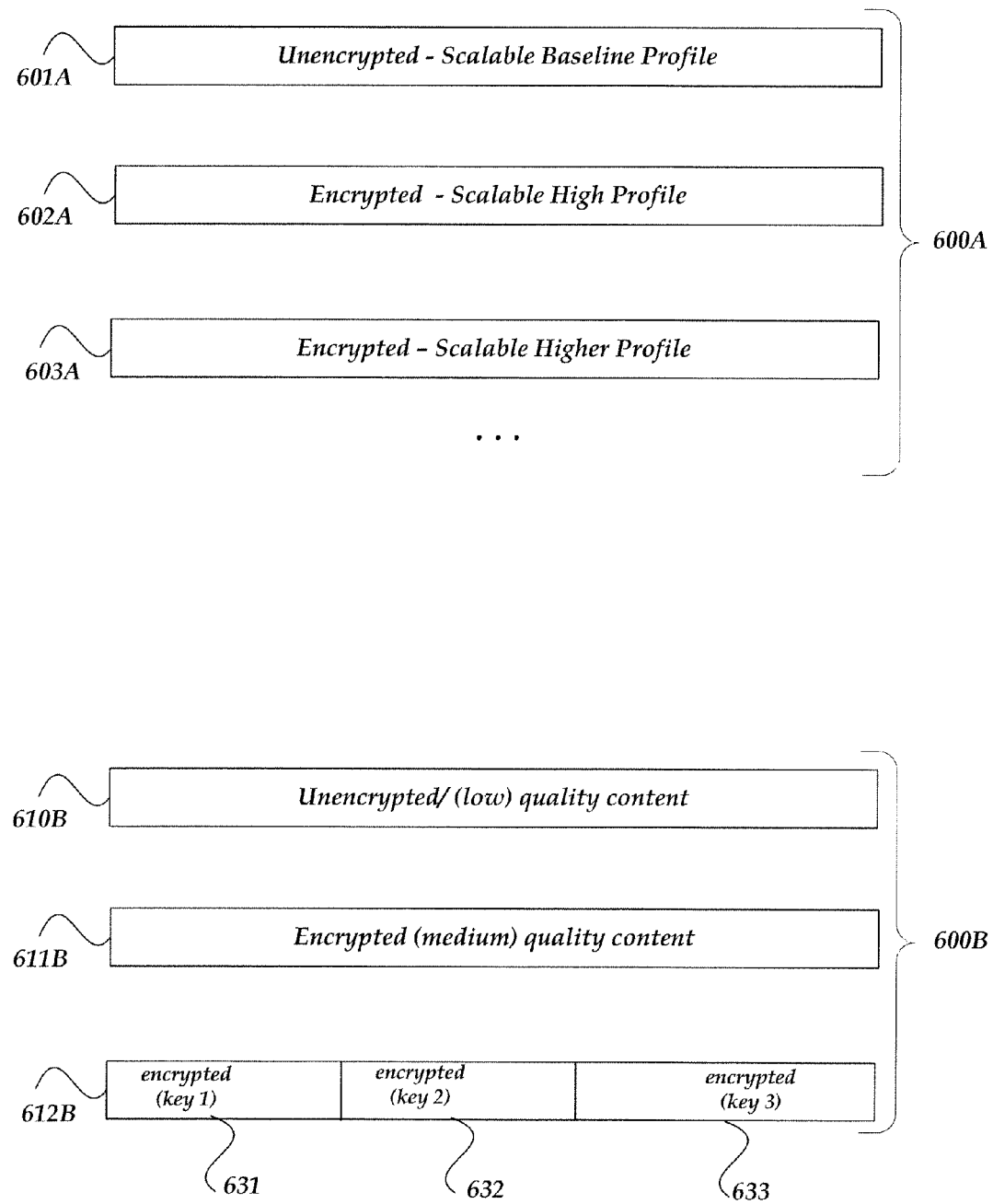
FIG. 6 illustrates non-limiting, non-exhaustive examples of possible embodiments of at least one stream of content usable in dynamically changing stream quality of protected content.

FIG. 6 illustrates non-limiting, non-exhaustive examples of possible embodiments of at least one stream of content usable in dynamically changing stream quality of protected content. It should be understood that the provided at least one stream of content, 600A and 600B are merely examples, and that the innovations described herein are not constrained by these examples. Moreover, it should be understood that the at least one stream of content 600A and 600B represent having the same content, just different based on a quality feature.

As shown, the at least one stream of content 600A includes substreams 601A-603A, where each substream may be combined with another substream to vary a quality of the content of the at least one stream that is played. In one embodiment substreams 601A-603A may represent content configured using the scalable video coding compression standard. However, audio components may also be scaled in a similar manner. In any event, in one embodiment, at least one substream may provide a scalable baseline profile for the stream of content 600A. In one embodiment, the substream 601A might be unencrypted to enable a time to play a first frame of the content to be reduced. That is, a time to play a first frame might be reduced by removing decryptions actions in readying the content for play. However, in another embodiment, substream 601A may be encrypted.

In one embodiment, the substream 601A might be considered to have a lowest level of quality for the substreams 601A-603A. By combining each of the substreams, a progressively higher level of quality may be obtained, until combining all of the substreams provides a highest level of quality for the at least one stream of content 600A.

The at least one stream of content 600B is illustrated as comprising three streams, 610-B-612B. It should be recognized that more or less streams may be employed, and thus embodiments are not limited to three streams within the at least one stream of content 600B.

Each stream within the at least one stream of content 600B may be readied and played separate from another stream in the at least one stream of content 600B. That is, unlike the at least one stream of content 600A, where each substream is combined with one or more substreams, below it, to create a stream—except of course for the substream 601A, which may be played without so requiring combining—each stream within the at least one stream of content 600B, may be played without needing to be combined with another stream.

Further, stream 610B may include content that has a lesser quality feature than content within stream 611B or stream 612B. Further, in one embodiment, stream 610B may be unencrypted to enable a fast time to playing a first frame, as discussed above. Stream 612B may be considered as having a highest level of quality of the content over streams 610B or 611B. Further, as shown, in one embodiment, stream 612B may be encrypted using different encryption keys for different portions of the stream. However, it should be understood that stream 611B may also be so encrypted. Further, in one embodiment, the encryption mechanisms or DRM surrounding the keys may also be different between each stream, and/or the keys for each stream may be different between the streams, as well.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A client device, comprising:
a non-transitory memory storing executable computer program instructions; and
one or more processors in communication with the memory and adapted to execute the computer program instructions to perform actions including:
receiving, by the client device, at least one stream of content from a remote server via a network interface, the at least one stream of content having a plurality of subset bitstreams of different levels of defined quality of content;
detecting, by the client device, a level of trust for the client device responsive to one or more security checks performed on the client device;
selecting, by the client device, a subset bitstream of the received at least one stream of content having a level of defined quality of content based on the detected level of trust;
playing, by the client device, the selected subset bitstream having the selected level of defined quality; and
while playing the subset bitstream having the selected level of defined quality, the client device:
monitoring to detect a change in the level of trust for the client device;
when the level of trust is detected to decrease for the client device, seamlessly switching play to a subset bitstream having a decreased level of defined quality of content such that no interruption occurs between playing the subset bitstream having the selected level of defined quality and the subset bitstream having the decreased level of defined quality; and
when the level of trust is detected to increase for the client device, seamlessly switching play to a subset bitstream having an increased level of defined quality of content such that no interruption occurs between playing the subset bitstream having the selected level of defined quality and the subset bitstream having the increased level of defined quality.

2. The client device of claim 1, wherein at least one stream of content comprises a scalable video coding stream that comprises the plurality of subset bitstreams, each bitstream having a different level of defined quality of content than an other bitstream in the plurality of subset bitstreams.

3. The client device of claim 1, wherein the different level of defined quality differs based on at least one of a spatial resolution, temporal resolution, a video quality, an audio quality, a bit rate, or a dimensional feature.

4. The client device of claim 1, wherein monitoring to detect a change in the level of trust for the client device comprises monitoring for changes to at least one of an operating system, one or more drivers, or a hardware component of the client device.

5. The client device of claim 1, wherein monitoring to detect a change in the level of trust for the client device comprises detecting a change in a network connection type of a network connection connecting the client device to a display device.

6. A computer-based method operating on a client device, comprising:

receiving, by the client device, at least one stream of content from a remote server via a network interface, the at least one stream of content having a plurality of subset bitstreams of different levels of defined quality of content;

detecting, by the client device, a level of trust for the client device responsive to one or more security checks performed on the client device;

selecting, by the client device, a subset bitstream of the received at least one stream of content having a level of defined quality of content based on the detected level of trust;

playing, by the client device, the selected subset bitstream having the selected level of defined quality; and while playing the subset bitstream having the selected level of defined quality, the client device:

monitoring to detect a change in the level of trust for the computer device;

when the level of trust is detected to decrease for the computer device, seamlessly switching play to a subset bitstream having a decreased level of defined quality of content such that no interruption occurs between playing the subset bitstream having the selected level of defined quality and the subset bitstream having the decreased level of defined quality; and when the level of trust is detected to increase for the computer device, seamlessly switching play to a subset bitstream having an increased level of defined quality of content such that no interruption occurs between playing the subset bitstream having the selected level of defined quality and the subset bitstream having the increased level of defined quality.

7. The computer-based method of claim 6, wherein at least one stream of content comprises a scalable video coding stream that comprises the plurality of subset bitstreams, each bitstream having a different level of defined quality of content than an other bitstream in the plurality of subset bitstreams.

8. The computer-based method of claim 6, wherein the different level of quality differs based on at least one of a spatial resolution, temporal resolution, a video quality, an audio quality, a bit rate, or a dimensional feature.

9. The computer-based method of claim 6, wherein monitoring to detect a change in the level of trust for the computer device comprises monitoring for changes to at least one of an operating system, one or more drivers, or a hardware component of the computer device.

10. The computer-based method of claim 6, wherein monitoring to detect a change in the level of trust for the computer device comprises detecting a change in a network connection type of a network connection connecting the computer device to a display device.

11. A non-transitory computer readable medium having computer-executable instructions stored thereon, that in response to execution by a computer processor, cause the computer processor to perform operations comprising:

receiving, by a client device, at least one stream of content from a remote server via a network interface, the at least one stream of content having a plurality of subset bitstreams of different levels of defined quality of content;

detecting, by the client device, a level of trust for the client device responsive to one or more security checks performed on the client device;

selecting, by the client device, a subset bitstream of the received at least one stream of content having a level of defined quality of content based on the detected level of trust;

playing, by the client device, the selected subset bitstream having the selected level of defined quality; and while playing the subset bitstream having the selected level of defined quality, the client device:

monitoring to detect a change in the level of trust for the computing device;

when the level of trust is detected to decrease for the computing device, seamlessly switching play to a subset bitstream having a decreased level of defined quality of content such that no interruption occurs between playing the subset bitstream having the selected level of defined quality and the subset bitstream having the decreased level of defined quality; and when the level of trust is detected to increase for the computing device, seamlessly switching play to a subset bitstream having an increased level of defined quality of content such that no interruption occurs between playing the subset bitstream having the selected level of defined quality and the subset bitstream having the increased level of defined quality.

12. The computer readable medium of claim 11, wherein at least one stream of content comprises a scalable video coding stream that comprises the plurality of subset bitstreams, each bitstream having a different level of defined quality of content than an other bitstream in the plurality of subset bitstreams.

13. The computer readable medium of claim 11, wherein the different level of defined quality differs based on at least one of a spatial resolution, temporal resolution, a video quality, an audio quality, a bit rate, or a dimensional feature.

14. The computer readable medium of claim 11, wherein monitoring to detect a change in the level of trust for the client device comprises monitoring for changes to at least one of an operating system, one or more drivers, or a hardware component of the computing device.

15. The computer readable medium of claim 11, wherein monitoring to detect a change in the level of trust for the client device comprises detecting a change in a network connection type of a network connection connecting the computing device to a display device.

16. The client device of claim 1, wherein monitoring to detect a change in the level of trust for the client device comprises:

determining whether a suspect product is detected on the client device.

17. The client device of claim 1, wherein monitoring to detect a change in the level of trust for the client device comprises:

determining whether a component of the client device has been improperly modified.

18. The client device of claim 1, wherein monitoring to detect a change in the level of trust for the client device comprises:

actively probing components of the client device to detect a response indicating a change to the level of trust for the client device.

19. The client device of claim 1, wherein selecting the subset bitstream having the level of defined quality of content comprises:

using a scalable CODEC to combine one or more of the plurality of subset bitstreams to produce a stream of content having the defined quality of content.

\* \* \* \* \*